United States Patent Office 3,228,972
Patented Jan. 11, 1966

---

3,228,972
LOWER ALKYL ESTERS OF N-(ALKYL) MALEAMIC ACID
Herbert Schwartz, Smaragdplein 186, Utrecht, Netherlands
No Drawing. Filed Feb. 21, 1962, Ser. No. 174,694
6 Claims. (Cl. 260—482)

The invention relates to a novel improved process for the preparation of esters of amic acids in high yields. The invention also relates to novel esters of maleamic acids having the formula $$R_4-NH-\overset{O}{\underset{\|}{C}}-CH=CH-\overset{O}{\underset{\|}{C}}-OR_5 \qquad I$$

wherein $R_4$ is an alkyl group having 10 to 18 carbon atoms and $R_5$ is a lower alkyl group having 1 to 7 carbon atoms. The invention also relates to novel methods for combatting fungi, bacteria, nematodes and insects and a novel method for regulating the growth of plants.

Prior art attempts to prepare esters of amic acids, particularly unsaturated cis esters such as maleamic acid, have not been successful particularly if the said amic acid is not stable. In U.S. Patent No. 2,885,319 methyl maleanilate was formed by refluxing maleanilic acid in methanol in the presence of concentrated sulfuric acid. In U.S. Patent No. 2,779,704 esters of substituted maleanilic acids were prepared by refluxing the acid in an alcohol in the presence of p-toluenesulfonic acid as a catalyst. However, attempts to repeat this procedure resulted mainly in cleavage of the amide linkage to give the corresponding aniline salt and the corresponding di-alkyl maleate.

Other methods such as refluxing maleanil in methanolic hydrogen chloride and reacting silver salts of maleamic acids with alkyl halides are not commercially acceptable because of the expense of the starting materials. In U.S. Patent No. 2,627,487 maleamates are prepared by reacting the mono-ethyl ester of maleic acid chloride with an amine but is not economical due to the difficulty in preparing the said ester chloride.

The reaction of potassium N-alkyl maleamates with methyl iodide is said to produce various methyl N-alkyl maleamates (Mehta et al., J. Org. Chem., vol. 25 (1960), pages 1012–1015). However, upon repeating this experiment, the infrared spectrum and a fractional crystallization of the product showed the product to be a mixture of N-alkyl maleamic acid, N-alkyl maleamide, and about 5% of methyl N-alkyl maleamate.

It is an object of the invention to provide an economical and simple method for producing esters of acids, particularly maleamic acids, in high yields.

It is a further object of the invention to provide novel esters of N-alkyl maleamic acids wherein the alkyl group has 10 to 18 carbon atoms.

It is another object of the invention to provide a novel method for combatting insects.

It is an additional object of the invention to provide a novel method for combatting fungi.

It is another object of the invention to provide a novel method for regulating the growth of plants.

It is a further object of the invention to provide a novel method for combatting bacteria.

It is another object of the invention to provide a novel method for combatting nematodes.

These and other objects and advantages of the invention will become obvious from the following detailed description.

The process of the invention for the preparation of esters of amic acids having the formula $$R_2-\underset{\underset{R_1}{|}}{N}-\overset{O}{\underset{\|}{C}}-R-\overset{O}{\underset{\|}{C}}-OR_3 \qquad II$$

wherein R is selected from the group consisting of arylene, cycloalkylene and saturated and unsaturated alkylene radicals, $R_1$ and $R_2$ are selected from the group consisting of hydrogen, alkyl radicals having 1 to 18 carbon atoms and aryl radicals having 6 to 18 carbon atoms and $R_3$ is selected from the group consisting of cycloalkyl, arylalkyl and alkyl radicals having 1 to 18 carbon atoms comprises reacting an amic acid having the formula $$R_2-\underset{\underset{R_1}{|}}{N}-\overset{O}{\underset{\|}{C}}-R-\overset{O}{\underset{\|}{C}}-OH \qquad III$$

wherein R, $R_1$ and $R_2$ have the above definitions with an alcohol selected from the group consisting of cycloalkanols, arylalkanols and aliphatic alcohols having 1 to 18 carbon atoms in the presence of a dehydrating agent selected from the group consisting of phosphorous pentoxide and concentrated sulfuric acid at moderate temperatures to form the said ester and recovering the latter. The process is particularly useful in forming the cis esters of unsaturated amic acids as most other methods give the trans esters rather than the cis esters.

The reaction temperature will vary depending upon the particular ester being formed and upon the particular dehydrating agent being used. When sulfuric acid is used as the dehydrating agent, the temperature may vary from 0° to 50° C., but room temperature is preferred. When phosphorous pentoxide is used as the dehydrating agent, the reaction temperature may vary from 0° to 120° C., particularly if the phosphorous pentoxide is added to the alcohol before the esterification reaction to form alkyl phosphates which then react with the acid to form the ester. At higher temperatures the desired esters are rapidly converted to imides and the yields are reduced. If desired, the reaction may be effected in the presence of an inert organic solvent.

Examples of suitable amic acids which may be used as starting materials are saturated and unsaturated aliphatic acids such as maleamic acids, fumaramic acids, succinamic acids, glutaramic acids and adipamic acids; and aromatic amic acids such as phthalamic acids, etc. which may or may not be N-substituted. Specific examples of said amic acids in addition to the acids used in the examples are N,N-diethyl-succinamic acid, N,N-dipropyl-succinamic acid, N,N-pentamethylene-succinamic acid, N,N-diethyl-maleamic acid, N,N-pentamethylene-maleamic acid, N,N-diethyl-glutaramic acid, N,N-dipropyl-glutaramic acid, N,N-diethyl-adipamic acid, N,N-dipropyl-adipamic acid, etc.

The alcohols used in the esterification process may be cycloalkyl, arylalkyl or alkyl alcohols having 1 to 18 carbon atoms. Examples of suitable alcohols are methanol, ethanol, propanol, butanol, hexanol, cyclohexyl alcohol, cyclopentyl alcohol, benzyl alcohol, 2-phenyl ethanol, etc.

The novel maleamic acid esters of the invention have the formula $$R_4-NH-\overset{O}{\underset{\|}{C}}-CH=CH-\overset{O}{\underset{\|}{C}}-OR_5 \qquad I$$

wherein $R_4$ is an alkyl radical having 10 to 18 carbon atoms and $R_5$ is a lower alkyl radical having 1 to 7 carbon atoms. The novel maleamic acid esters have an unexpected nematocidal and bactericidal activity compared to N-lower alkyl substituted esters.

The method of combatting nematodes comprises contacting the nematodes with a compound of Formula I. The compound can be applied in the usual ways such as an aqueous solution.

The method of combatting bacteria comprises contacting the bacteria with a compound of Formula I. The compound can be applied in the usual manner.

The method of regulating the growth of plants comprises contacting the plants with a compound having the formula

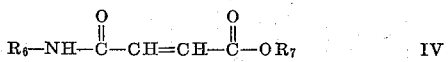

wherein $R_6$ is an alkyl radical having 1 to 18 carbon atoms and $R_7$ is an alkyl radical having 1 to 7 carbon atoms.

The method of combatting fungi comprises contacting the fungi with a compound of Formula IV.

The method of combatting insects comprises contacting the insects with a compound of Formula IV.

In the following examples there are described several preferred embodiments to illustrate the invention. However, it should be understood that the invention is not intended to be limited to the specific embodiments.

EXAMPLE I

*Preparation of the methyl ester of N-(n-hexyl)maleamic acid*

2 grams of phosphorous pentoxide were added to 250 cc. of absolute methanol while cooling and then 2 grams of N-(n-hexyl)maleamic acid were added. The resulting suspension was agitated for 8 hours at room temperature until all of the acid had dissolved. The reaction mixture was then neutralized with concentrated aqueous sodium bicarbonate and extracted with ether. The extract was dried over anhydrous sodium sulfate and the ether was evaporated to leave a residue of the methyl ester of N-(n-hexyl)maleamic acid.

The residue was recrystallized from petroleum ether to give 2 grams (94% of theory) of the white, crystalline ester having a melting point of 44.5–45.5° C. and a nitrogen analysis of 6.49% (theoretical—6.57%).

By using an analogous process, the ethyl, propyl, butyl and amyl esters of N-(n-hexyl)maleamic acid were prepared. The said esters were all liquids.

EXAMPLE II

*Preparation of methyl ester of N-(n-octyl)maleamic acid*

2.3 grams of N-(n-octyl)maleamic acid were added to a solution of 5 cc. of concentrated sulfuric acid in 180 cc. of absolute methanol under agitation. After about 8 hours the acid was completely dissolved and was then treated as in Example I. 2.2 grams (91% of theory) of white, crystalline methyl ester of N-(n-octyl)maleamic acid melting at 56 to 57° C. was obtained. A nitrogen determination found 5.75% nitrogen (5.80%—theoretical).

The ethyl and propyl esters of N-(n-octyl) maleamic acid were also formed in an analogous manner. Both products were crystalline solids. The butyl and higher esters were liquid.

EXAMPLE III

Using the procedure of Example I, N-(n-decyl)maleamic acid was esterified with methanol to form the methyl ester of N-(n-decyl)maleamic acid having a melting point of 64-65° C. The theoretical nitrogen content was calculated as 5.20% and the nitrogen determination found was 5.19%. The methyl ester of N-(n-dodecyl) maleamic acid, N-(n-tetradecyl) maleamic acid and N-(n-octadecyl)maleamic acid were produced by an analogous process.

EXAMPLE IV

*Preparation of methyl maleanilate*

2 grams of maleanilic acid were added to a solution of 1 gram of phosphorous pentoxide in 200 cc. of dry methanol and the suspension was agitated until all the acid dissolved. The resulting clear solution was poured into a concentrated solution of sodium bicarbonate. After completion of the neutralization more water was added until an oil formed on the surface. The oil was crystallized to give 2 grams of methyl maleanilate.

EXAMPLE V

*Preparation of ethyl maleanilate*

2 g. of maleanilic acid were added to a solution of 5 cc. of concentrated sulfuric acid in 200 cc. of absolute alcohol. The suspension was then agitated until all the acid was in solution. The clear solution was then poured into a concentrated solution of sodium bicarbonate. After completion of the neutralization the solution was extracted with ether. The extract was then dried over anhydrous sodium sulfate and evaporated in vacuo to leave 1.9 g. of crude ethyl maleanilate as a residue. The residue was recrystallized in a solution of benzene in ligroin to give white needles melting at 64–65°.

EXAMPLE VI

*Preparation of methyl N-(p-chlorophenyl)maleamate*

3.6 g. of N-(p-chlorophenyl)maleamic acid were suspended in a solution of 2 g. phosphorous pentoxide in dry methanol. The suspension was agitated until all the acid was in solution. The solution was then worked up in the usual manner to obtain a 60% yield of methyl N-(p-chlorophenyl)maleamate.

EXAMPLE VII

*Preparation of methyl N-(2,5-dichlorophenyl)maleamate*

4 g. of N-(2,5-dichlorophenyl)maleamic acid were suspended in a solution of concentrated sulfuric acid in methanol and agitated until solution. The solution was when worked up in the usual manner to give a 75% yield of methyl N-(2,5-dichlorophenyl)maleamate.

EXAMPLE VIII

*Preparation of methyl N-(3,4-dichlorophenyl) fumaramate*

To 200 ml. of dry methanol 1 g. of phosphorous pentoxide was added with cooling, and then 2 g. of N-(3,4-dichlorophenyl)fumaramic acid were added to this solution. The suspension was agitated until all the acid had dissolved (heating slightly to 50° C. helped dissolve the acid). The reaction mixture was then worked up in the usual manner to yield 1.8 g. of methyl N-(3,4-dichlorophenyl)fumaramate (85.5% of theory) as white needles melting at 186°. The analysis for nitrogen found 4.89% while the theoretical requirement was 5.11%.

EXAMPLE IX

By the process of Example VIII N-(n-hexyl)fumaric acid was reacted with butanol to form butyl N-(hexyl) fumarate having a melting point of 34.5° to 36.5° C. The analysis for nitrogen found 5.52% (5.48% theoretical).

EXAMPLE X

*Preparation of methyl N-(2,4-dichlorophenyl) succinamate*

N-(2,4-dichlorophenyl)succinamic acid was esterified by means of phosphorous pentoxide and then worked up in the usual manner to give an 80% yield white crystals of methyl N-(2,4-dichlorophenyl)succinamate melting at 98.5–99.5° after recrystallization in cyclohexane plus benzene. A nitrogen determination found 5.16% while theory required 5.08%.

TEST OF NEMATOCIDAL ACTIVITY

The tests were carried out in stoppered test tubes containing 10 cc. of the solution to be tested and the nematode population at the time of seeding was adjusted to 50 to 75 per tube. The tests were run in duplicate and the blanks contained nema in tap water. The organism used was a species of Panagrellus, an active saprozoic nematode. The test results, summarized in Table I shows that the methyl ester of N-(n-decyl)maleamic acid at 50 p.p.m. has an activity equal to Nemagon while the methyl ester of N-(n-hexyl)maleamic acid has very little activity at this concentration. The methyl ester of N-(2,5-dichlorophenyl)maleamate has no practical nematocidal activity.

*Table I*

| Compound tested | Dose (p.p.m.) | Percent Mortality | | |
|---|---|---|---|---|
| | | 1st day | 2nd day | 3rd day |
| Methyl N-(n-hexyl)maleamate | 50 | 0 | 0 | 75 |
| | 5 | 0 | 0 | 3 |
| Methyl N-(n-decyl)maleamate | 50 | 63 | 100 | 100 |
| | 5 | 0 | 0 | 0 |
| Methyl N-(2,5-dichlorophenyl)-maleamate | 50 | 0 | 0 | 0 |
| | 5 | 0 | 0 | 0 |

TEST OF BACTERICIDAL ACTIVITY

The test used was the Agar Plate-Disc Diffusion Technique and the organisms used were *Staphylococcus aureus* (gram positive) and *Salmonella typhosa* (gram negative). Blank, sterile paper discs having a diameter of 0.7 cm. were dipped into the solution to be tested and were placed on the "seeded" nutrient Agar. Bactericidal or bacteriostatic activity was measured as the width of the "clear" zone or zone of inhibition extending from the periphery of the sterile disc to the edge of the "clear" zone taken after three days. The results which are summarized in Table II show that methyl N-(n-decyl)maleamate is about 3 times more active against gram positive bacteria than methyl N-(n-hexyl)maleamate and better than 4 times more active than methyl N-(2,5-dichlorophenyl)-maleamate.

*Table II*

| Compound tested | Dose (p.p.m.) | Zones in mm. | |
|---|---|---|---|
| | | S. aureus | S. typhosa |
| Methyl N-(n-hexyl)maleamate | 1,000 | 9 | 0 |
| Methyl N-(n-decyl)maleamate | 1,000 | 24.5 | 0 |
| Methyl N-(2,5-dichlorophenyl) maleamate | 1,000 | 6 | 0.5 |

HERBICIDAL ACTIVITY

The following esters were tested in hydrocarbon solutions at a dosage equal to one pound per acre. The phytotoxicity ratings are based on the scale —0=no effect to 10=100% kill. As can be seen from the data in Table III, the aggregate toxicity varies only slightly as the N-alkyl group is varied but that when the ester alkyl is increased to 3 or more carbon atoms there is an unexpected increase in the aggregate toxicities. The table also shows that the higher esters are more toxic to broad leafs than to grasses and can be used to control weeds such as pigweed and wild mustard in fields of crops such as beans and cotton which is not possible with herbicides such as 2,4-D (2,4-dichlorophenoxyacetic acid).

The methyl and other esters of N-(n-octadecyl)maleamate are useful as cotton defoliants. For example, when the methyl ester is applied to cotton fields at a rate of 1 pound per acre, the cotton was defoliated 50%.

A comparison of the aggregate phytotoxicity of a series of methyl N-alkyl maleamates on seven crops was made. The crops were beets, tomato, radish, flax, rye grass, oats and wheat. The compounds were formulated into a composition containing 10% of the maleamate to be tested, 10% Triton X-161, 10% Velsical AR50G and 70% butyl carbitol acetate which was dispersed in a hydrocarbon solvent and applied at a dosage of 1.5 pounds per acre. The results are summarized in Table IV and show that the herbicidal activity increases with the chain length of the N-alkyl substituent.

*Table IV*

| Ester | Aggregate Phytotoxicity |
|---|---|
| Methyl N-(n-hexyl)maleamate | 17 |
| Mehtyl N-(n-octyl)maleamate | 15 |
| Methyl N-(n-decyl)maleamate | 20 |
| Methyl N-(n-dodecyl)maleamate | 35 |
| Methyl N-(n-tetradecyl)maleamate | 30 |

INSECTICIDAL ACTIVITY

The compounds to be tested were applied as a thin film of acetone containing 1000 p.p.m. or 500 p.p.m. of the test compound to the walls of a test tube (25 mm. × 200 mm.) and 10 flies (*Drosophila melanogaster*) were released into the test tube which was then stoppered with absorbent cotton. The flies had sufficient food for three days. The percent of the flies killed was determined and the results are summarized in Table V.

*Table V*

| Compound | Dose (p.p.m.) | Percent Mortality | | |
|---|---|---|---|---|
| | | 12 hr. | 20 hr. | 48 hr. |
| Methyl N-(n-hexyl)maleamate | 1,000 | 100 | | 100 |
| | 500 | | 90 | |
| Methyl N-(n-decyl)maleamate | 1,000 | 33 | | 40 |

The insecticidal activity was also tested on the confused flour beetle (*Tribolium confusum*) by placing the beetles in 9.6 cm. petri dishes, to which had been added one milliliter of acetone containing 0.5% of the compound to be tested and the acetone allowed to evaporate. The results are summarized in Table VI.

*Table VI*

| Ester | Percent Mortality | |
|---|---|---|
| | 48 hr. | 96 hr. |
| Ethyl N-(n-octyl)maleamate | 35 | 70 |
| Propyl N-(n-octyl)maleamate | 50 | 90 |

*Table III*

| Crops | Methyl N-(n-hexyl) maleamate | Methyl N-(n-decyl) maleamate | Methyl N-(n-octyl) maleamate | Ethyl N-(n-octyl) maleamate | Propyl N-(n-octyl) maleamate |
|---|---|---|---|---|---|
| Beets | 0 | 0 | 1 | 4 | 10 |
| Tomato | 3 | 2 | 9 | 8 | 10 |
| Radish | 3 | 8 | 2 | 2 | 9 |
| Flax | 9 | 10 | 8 | 8 | 10 |
| Rye Grass | 1 | 1 | 1 | 1 | 4 |
| Oats | 1 | 0 | 1 | 1 | 1 |
| Wheat | 0 | 0 | 1 | 0 | 1 |
| Beans | 3 | 3 | 1 | 2 | 0 |
| Cotton | 0 | 0 | 1 | 1 | 1 |
| Aggregate Toxicity | 20 | 24 | 25 | 27 | 46 |

FUNGICIDAL ACTIVITY

The fungicidal activity of the compounds of Formula IV was demonstrated on oat seed heavily infected with *Helminthosporium avenae*. The oat seed was immersed for 15 minutes in solutions containing varying concentrations of the test materials. At the end of the period the solution was drained off and the seed then plated out on petri dishes containing moistened filter paper. The results are summarized in Table VII.

Table VII

| Ester | Dosage (p.p.m.) | Percent Disease Control |
|---|---|---|
| Methyl N-(n-hexyl)maleamate | 10,000 | 100 |
|  | 5,000 | 100 |
|  | 1,000 | 73 |
|  | 500 | 54 |
|  | 100 | 53 |
|  | 50 | 38 |
| Methyl N-(n-decyl)maleamate | 500 | 26 |
|  | 50 | 48 |

Methyl N-(n-hexyl)maleamate also inhibited the germination of spores of *Botrytis allii* and *Aspergillus niger* at a concentration of only 10 p.p.m. and *Penicillium italicum* at a dilution of only 2 p.p.m.

Various modifications of the process and products of the invention may be made without departing from the spirit or scope thereof and it is to be understood that the invention is to be limited only as defined in the appended claims.

I claim:

1. Maleamic acid esters having the formula $$R_4-NH-\overset{O}{\underset{\|}{C}}-CH=CH-\overset{O}{\underset{\|}{C}}-OR_5$$

wherein $R_4$ is an alkyl radical having 10 to 18 carbon atoms and $R_5$ is a lower alkyl radical having 1 to 7 carbons atoms.

2. The lower alkyl esters of N-(n-decyl) maleamic acid, said alkyl having 1 to 7 carbon atoms.
3. The lower alkyl ester of N-(n-tetradecyl) maleamic acid, said alkyl having 1 to 7 carbon atoms.
4. The lower alkyl esters of N-(n-dodecyl) maleamic acid, said alkyl having 1 to 7 carbon atoms.
5. Methyl N-(n-decyl) maleamate.
6. Methyl N-(n-octadecyl) maleamate.

References Cited by the Examiner

UNITED STATES PATENTS

| | | | |
|---|---|---|---|
| 2,325,791 | 8/1943 | Moore et al. | 167—22 |
| 2,333,666 | 11/1943 | Moore et al. | 167—22 |
| 2,720,452 | 10/1955 | Denny | 71—2.7 |
| 2,768,966 | 10/1956 | Vassel | 260—482 |
| 2,777,872 | 1/1957 | Shacklett | 260—482 |
| 2,779,704 | 1/1957 | Ligett | 260—471 X |
| 2,885,319 | 5/1959 | Ligett | 260—471 X |
| 2,913,326 | 11/1959 | Tilles et al. | 71—2.7 |

OTHER REFERENCES

Coleman: J. Org. Chem., vol. 24, pp. 135–136 (1959).
Mehta: J. Org. Chem., vol. 25, pp. 1013–15 (1960).

LORRAINE A. WEINBERGER, *Primary Examiner.*

LEON ZITVER, *Examiner.*